United States Patent [19]

Hay

[11] 3,765,065
[45] Oct. 16, 1973

[54] BEARING LOCKING DEVICE

[75] Inventor: Charles N. Hay, Sandusky, Ohio

[73] Assignee: General Motors Corporation, Detroit, Mich.

[22] Filed: May 4, 1972

[21] Appl. No.: 250,417

[52] U.S. Cl. ............... 24/256, 24/255 C, 85/8.8, 287/52.09, 308/236
[51] Int. Cl. ............................................ A44b 21/00
[58] Field of Search ............... 85/8.8; 308/236; 287/52.06, 52.07, 52.09; 24/255 C, 255 R, 255 A, 255 TV, 256, 257 R, 81 PE

[56] References Cited
UNITED STATES PATENTS

| | | | |
|---|---|---|---|
| 3,662,642 | 5/1970 | Bernard | 85/8.8 |
| 2,665,930 | 1/1954 | Stanley | 287/52.06 |
| 2,690,937 | 10/1954 | Leister | 287/52.09 |
| 3,401,436 | 9/1968 | Bradshaw | 24/256 |

Primary Examiner—James T. McCall
Assistant Examiner—Kenneth J. Dorner
Attorney—J. L. Carpenter et al.

[57] ABSTRACT

A unitary sheet metal device for locking a loose fitting bearing ring to a shaft comprises first and second snap rings connected by an integral bight. The snap rings have internal surfaces adapted to frictionally grip the shaft and the bearing ring respectively. Each of the snap rings are split and have holes for expanding them during assembly to the shaft and bearing ring. The holes in the snap rings may be aligned so that the snap rings are simultaneously expandable. The holes in one snap ring may also be located outside the outline of the other snap ring so that the snap rings are independently expandable.

7 Claims, 7 Drawing Figures

Patented Oct. 16, 1973 3,765,065

BEARING LOCKING DEVICE

This invention relates generally to bearing locking devices and more specifically to a device for locking a loose fitting antifriction bearing ring to a plain shaft.

In the past, antifriction bearings have been mounted on shafts by press fitting the inner bearing ring on a shaft until it seats against a shoulder of the shaft. Such mounting practice requires close control of the shaft and bearing bore diameter and accurate location of the shoulder. In many instances, particularly light duty applications, the cost of such accuracy is not warranted. For this reason loose fits between the bearing inner ring and a plain shaft are employed in combination with some sort of device to clok the bearing to the shaft at the proper location.

IN the past, such devices have generally involved the use of either eccentric locking collars or set screws. Both of these schemes, however, can cause the bearing to cock on the shaft within the limits of the clearance provided by the loose fit which is undesirable. Moreover these prior devices require either expensive machining operations to provide the necessary eccentric surfaces or the drilling and tapping of holes for set screws and means for protecting the shaft from damage by the set screws.

The present invention provides a simplified and improved means for mounting a bearing ring to a shaft which avoids the above disadvantages of prior means by use of a simple unitary sheet metal device which is capable of accurately locating a bearing ring on a plane cylindrical shaft.

The exact nature of this invention as well as other objects and features thereof will be readily apparent from consideration of the following specification relating to the annexed drawings in which.

Figure 1:
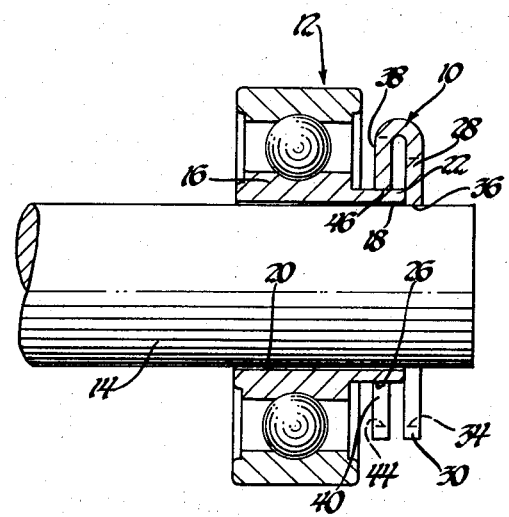
FIG. 1 is an elevation partially in cross section of a device for locking a loose fitting bearing ring on a plain cylindrical shaft in accordance with this invention.

Referring now to the drawings and more specifically to FIG. 1 the bearing locking device 10 is illustrated assembled to a ball bearing 12 and a plain cylindrical shaft 14. The inner ring 16 of the bearing 12 has a bore 18 which is loosely fitted on the shaft 14 as indicated by the space 20. The space 20 is only a few thousandths of an inch but it has been exaggerated in FIG. 1 for the purpose of illustration. An integral extension 22 on the inner ring 16 provides an annular surface 26 of uniform diameter concentric with the axis of the bearing ring 16. The locking device 10 frictionally grips the surface 26 and the shaft 14 to accurately locate the bearing 12 on the shaft 14 and lock the inner ring 16 to it as will hereafter more fully appear by a detailed description of the locking device 10.

Figure 2:
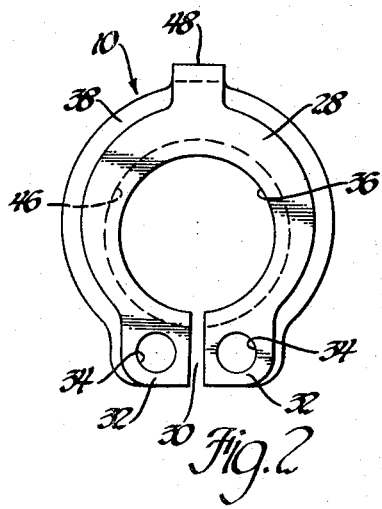
FIG. 2 is a front view of the locking device shown in FIG. 1.
Figure 3:
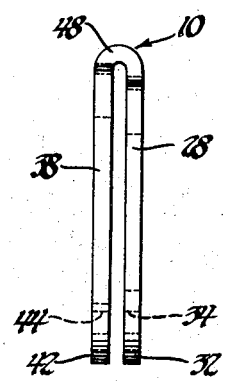
FIG. 3 is a side view of the locking device shown in FIG. 2.
Figure 4:
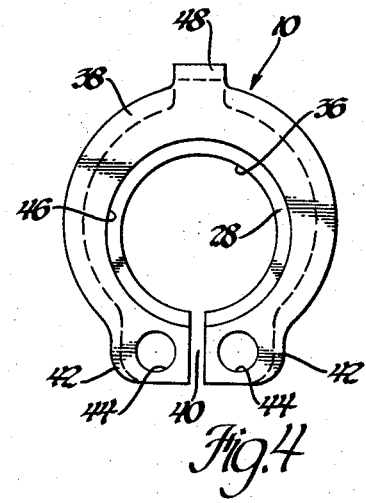
FIG. 4 is a rear view of the locking device shown in FIG. 2.

Referring now to FIGS. 2, 3 and 4, the bearing locking device 10 comprises a first snap ring 28 having a radial split 30 and ears 32 adjacent opposite sides of the split 30. Each of the ears 32 is provided with a hole 34. The snap ring 28 has an internal circumferential surface 36 adapted to frictionally grip the shaft 14 by the diameter of the surface 36 being slightly less than that of the shaft 14.

The bearing locking device 10 also includes a second snap ring 38 which inlike manner has a radial split 40 and ears 42 adjacent opposite sides thereof. Th ears 42 are similarly each provided with a hole 44. The snap ring 38 has an internal circumferential surface 46 which is larger in diameter than the internal surface 36 but which is slightly less than that of the annular surface 26 on the bearing ring 16 so that the snap ring 38 is adapted to frictionally grip the bearing ring 16. The substantially coaxial and parallel snap rings 28 and 38 are spaced and connected by an integral bight 48 giving the device 10 a U-shaped configuration in the side view as shown in FIG. 3. In the form of the locking device 10 shown in FIGS. 1, 2 and 3, the snap rings 28 and 38 are so oriented so that their respective splits 30 and 40 and holes 34 and 44 are aligned.

The bearing locking device 10 is assembled to the shaft 14 and bearing 12 by disposing a two pointed tool (not shown) into the aligned holes 34 and 44 and expanding both of the snap rings. The bearing locking device 10 is sufficiently resilient to elastically deform enough to permit the surface 46 on the snap ring 38 to move along the annular surface 26 on the inner ring 16 and the surface 36 of the snap ring 28 to move along the shaft 14. With both snap rings expanded, the snap ring 28 is disposed around the shaft 14 against the flat end surface of the inner ring 16 which aligns the snap ring 38 with a portion of the annular surface 26. Upon release of the snap rings 28 and 38 the inner circumferential surface 46 of the snap ring 38 frictionally grips the annular surface 26 and the inner circumferential surface 36 of the snap ring 28 frictionally grips the surface of the shaft 14 thereby securing the bearing ring 16 to the shaft 14 against both axial and rotational movement. The bearing 12 may thereafter be adjusted on the shaft 14 by expanding the snap ring 38 only which is done by inserting a two pointed tool only into the holes 44.

It is to be noted that the abutment of the inner marginal portion of the snap ring 28 with the flat end surface of the inner ring 16 in combination with the snug fit of the inner circumferential surfaces on the respective snap rings prevents cocking of the inner ring 16 on the shaft 14.

It is also to be noted that the bearing locking device comprises a simple unitary sheet metal device which may be inexpensively manufactured by simple stamping and bending operations.

Figure 5:
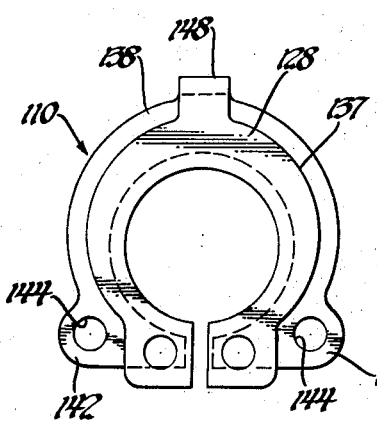
FIG. 5 is a front view of a modified locking device
Figure 6:
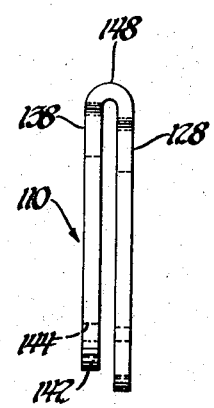
FIG. 6 is a side view of the modified locking device shown in FIG. 5
Figure 7:
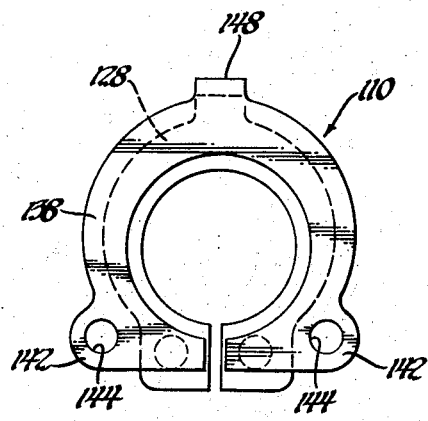
FIG. 7 is a rear view of the modified locking device shown in FIG. 5.

A modified form of bearing locking devices is shown in FIGS. 5, 6 and 7. The modified bearing locking device 110 is similar to that shown in FIGS. 2, 3 and 4 and locks a loose fitting bearing to a plain cylindrical shaft in the same manner. This modified form, however, provides for the independent expansion of the individual snap rings particularly the snap ring 138 although it is to be understood that the two snap rings 128 and 138 in the device 110 can be expanded simultaneously by a proper four pointed tool. The major structural difference of the locking device 110 lies in the ears 142 on the snap ring 138 which are in a substantially tangential relationship rather than a substantially radial relationship thus providing portions on the ears 142 which are outside the outline 137 of the snap ring 128. The holes 144 are located in these portions of the ears 142 outside the outline 137 so that the snap ring 138 is independently expandable by a two pointed tool from the outboard side of the bearing 12 which is the left side shown in FIGS. 1 and 6.

I wish it to be understood that I do not desire to be limited to the exact details of construction shown and described, for obvious modifications will occur to a person skilled in the art.

I claim:

1. A unitary sheet metal device for locking a loose fitting bearing ring to a shaft comprising
   a first flat C-shaped snap ring having a first radial split therethrough,
   first coplanar ears on said first snap ring adjacent opposite sides of said first radial split,
   a first internal circumferential surface on said first snap ring adapted to frictionally grip said shaft,
   said first ears having first holes for receiving a tool to expand said first snap ring whereby said first snap ring may be slid along said shaft,
   a second flat C-shaped snap ring having a second radial split therethrough,
   second coplanar ears on said second snap ring adjacent opposite sides of said second radial split,
   a second internal surface on said second snap ring adapted to frictionally grip an outer annular surface on said bearing ring,
   said second ears having second holes for receiving a tool to expand said second snap ring, and
   an integral bight connecting said first and second snap rings in a substantially coaxial and parallel relationship, said integral bight being connected to each of said first and second snap rings along a minor portion of their respective outer margins whereby said first and second snap rings are independently expandable.

2. The device as defined in claim 1 wherein said bearing ring has an integral extension of reduced diameter which terminates in an end face, wherein said outer annular surface is on said integral extension and wherein said first snap ring abuts said end face on said integral extension.

3. The device as defined in claim 1 wherein said first and second splits are aligned and said bight is diametrically opposite said splits.

4. The device as defined in claim 3 wherein said frist and second ears are generally radially disposed and said first and second holes are aligned whereby said first and second snap rings are also simultaneously expandable by a two pointed tool inserted into said first and second holes.

5. The device as defined in claim 3 wherein said first snap ring has an outline, said second ears have portions out of alignment with said outline and said second holes are located in said portions.

6. The device as defined in claim 3 wherein said first ears are generally radially disposed, said second ears are generally tangentially disposed and said second holes are circumferentially spaced from said first ears.

7. A unitary connector comprising
   a first flat C-shaped snap ring having a radial split therethrough, first coplanar ears on opposite sides of said radial split, first holes in said first ears and a first internal circumferential surface, and
   a second flat C-shaped snap ring disposed in a parallel and coaxial relation to said first flat C-shaped snap ring and connected thereto by an integral bight,
   said second flat C-shaped snap ring having a radial split therethrough, second coplanar ears on opposite sides of said radial split, second holes in said ears and a second internal circumferential surface having a diameter greater than the diameter of said first internal circumferential surface,
   said integral bight being connected to each of said first and second snap rings along a minor portion of their respective outer margins whereby said first and second snap rings are independently expandable.

* * * * *